(12) United States Patent
Bahirat et al.

(10) Patent No.: US 11,041,763 B2
(45) Date of Patent: *Jun. 22, 2021

(54) ADAPTIVE THROTTLING

(71) Applicant: Micron Technology, Inc., Boise, ID (US)

(72) Inventors: Shirish D. Bahirat, Longmont, CO (US); Aditi P. Kulkarni, Boulder, CO (US)

(73) Assignee: Micron Technology, Inc., Boise, ID (US)

( * ) Notice: Subject to any disclaimer, the term of this patent is extended or adjusted under 35 U.S.C. 154(b) by 57 days.

This patent is subject to a terminal disclaimer.

(21) Appl. No.: 16/599,421

(22) Filed: Oct. 11, 2019

(65) Prior Publication Data
US 2020/0041355 A1 Feb. 6, 2020

Related U.S. Application Data

(63) Continuation of application No. 15/623,592, filed on Jun. 15, 2017, now Pat. No. 10,481,014.

(51) Int. Cl.
*G01K 3/00* (2006.01)
*G01K 7/42* (2006.01)
*G06F 1/20* (2006.01)

(52) U.S. Cl.
CPC ............ *G01K 3/005* (2013.01); *G01K 7/425* (2013.01); *G06F 1/206* (2013.01)

(58) Field of Classification Search
CPC ........ G01K 3/005; G01K 7/425; G06F 1/206; Y02D 10/00
See application file for complete search history.

(56) References Cited

U.S. PATENT DOCUMENTS 6,484,117 B1 11/2002 Wohlfarth
6,564,288 B2 5/2003 Olarig et al.
6,811,309 B1 11/2004 Ravishanker
(Continued)

OTHER PUBLICATIONS

International Search Report and Written Opinion from related international application No. PCT/US2018/036984, dated Oct. 2, 2018, 9 pages.

(Continued)

*Primary Examiner* — Thomas C Lee
*Assistant Examiner* — Anzuman Sharmin
(74) *Attorney, Agent, or Firm* — Brooks, Cameron & Huebsch, PLLC

(57) ABSTRACT

An apparatus can include a first adaptive filter, a second adaptive filter, a filter, and a third adaptive filter. The first adaptive filter can be configured to determine an estimated magnitude of a control signal associated with a control measure based on a magnitude of a signal from a sensor, wherein the signal is indicative of operating temperature of a memory system. The second adaptive filter can be configured to determine an estimated operating temperature based on a magnitude of the control signal. The filter can be configured to determine a change magnitude of the control signal based on a difference between the magnitude of the signal from the sensor and a threshold operating temperature. The third adaptive filter can be configured to determine a throttle rate at which to apply the control signal based on a change magnitude of the control signal.

20 Claims, 7 Drawing Sheets

(56) References Cited

U.S. PATENT DOCUMENTS

| | | |
|---|---|---|
| 6,937,087 B2 | 8/2005 | Sim et al. |
| 2005/0063120 A1 | 3/2005 | Sinha et al. |
| 2013/0080679 A1 | 3/2013 | Bert |
| 2013/0110307 A1* | 5/2013 | Hensley .................. G06F 1/206 |
| | | 700/300 |
| 2016/0026231 A1 | 1/2016 | Ignowski et al. |
| 2016/0062421 A1 | 3/2016 | Sugawara et al. |
| 2016/0239057 A1 | 8/2016 | Kocagoez |
| 2016/0320971 A1 | 11/2016 | Postavilsky et al. |
| 2018/0342863 A1 | 11/2018 | Radun |
| 2018/0349243 A1* | 12/2018 | Shin ...................... G06F 3/0611 |

OTHER PUBLICATIONS

Search Report from related European application No. 18817098.9, dated Feb. 23, 2021, 10 pages.

\* cited by examiner

ADAPTIVE THROTTLING

PRIORITY INFORMATION

This application is a Continuation of U.S. application Ser. No. 15/623,592, filed on Jun. 15, 2017, the contents of which are incorporated herein by reference.

TECHNICAL FIELD

The present disclosure relates generally to semiconductor memory and methods, and more particularly, to an adaptive control system.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), static random-access memory (SRAM), and synchronous dynamic random access memory (SDRAM), among others. Non-volatile memory can retain stored data when not powered and can include NAND flash memory, NOR flash memory, phase change random access memory (PCRAM), resistive random access memory (RRAM), and magnetic random access memory (MRAM), among others.

Memory devices can be combined together to form a solid state drive (SSD). An SSD can include non-volatile memory (e.g., NAND flash memory and/or NOR flash memory), and/or can include volatile memory (e.g., DRAM and/or SRAM), among various other types of non-volatile and volatile memory. Flash memory devices can include memory cells storing data in a charge storage structure such as a floating gate, for instance, and may be utilized as non-volatile memory for a wide range of electronic applications. Flash memory devices typically use a one-transistor memory cell that allows for high memory densities, high reliability, and low power consumption.

An SSD can be used to replace hard disk drives as the main storage volume for a computer, as the solid state drive can have advantages over hard drives in terms of performance, size, weight, ruggedness, operating temperature range, and power consumption. For example, SSDs can have superior performance when compared to magnetic disk drives due to their lack of moving parts, which may avoid seek time, latency, and other electro-mechanical delays associated with magnetic disk drives.

Memory cells in an array architecture can be programmed to a target (e.g., desired) state. For instance, electric charge can be placed on or removed from the charge storage structure (e.g., floating gate) of a memory cell to program the cell to a particular data state. The stored charge on the charge storage structure of the memory cell can indicate a threshold voltage ($V_t$) of the cell, and the state of the cell can be determined by sensing the stored charge (e.g., the $V_t$) of the cell.

For example, a single level cell (SLC) can be programmed to a targeted one of two different data states, which can be represented by the binary units 1 or 0. Some flash memory cells can be programmed to a targeted one of more than two data states (e.g., 1111, 0111, 0011, 1011, 1001, 0001, 0101, 1101, 1100, 0100, 0000, 1000, 1010, 0010, 0110, and 1110) such that they represent more than one digit (e.g., more than one bit). Cells configured for programming to more than two data states may be referred to as extra level cells (XLC). For example, multi-level cells (MLCs), triple level cells (TLCs), and/or quad-level cells (QLCs) may be referred to generally herein as XLCs. XLCs can provide higher density memories for a given number of memory cells; however, XLCs may have a lower endurance and/or data retention capability as compared to SLCs. For example, an expected useful life of SLCs may be 50,000 to 100,000 cycles (e.g., program-erase cycles), while an expected useful life of XLCs may be 1,000 to 5,000 cycles.

DETAILED DESCRIPTION

Figure 1:
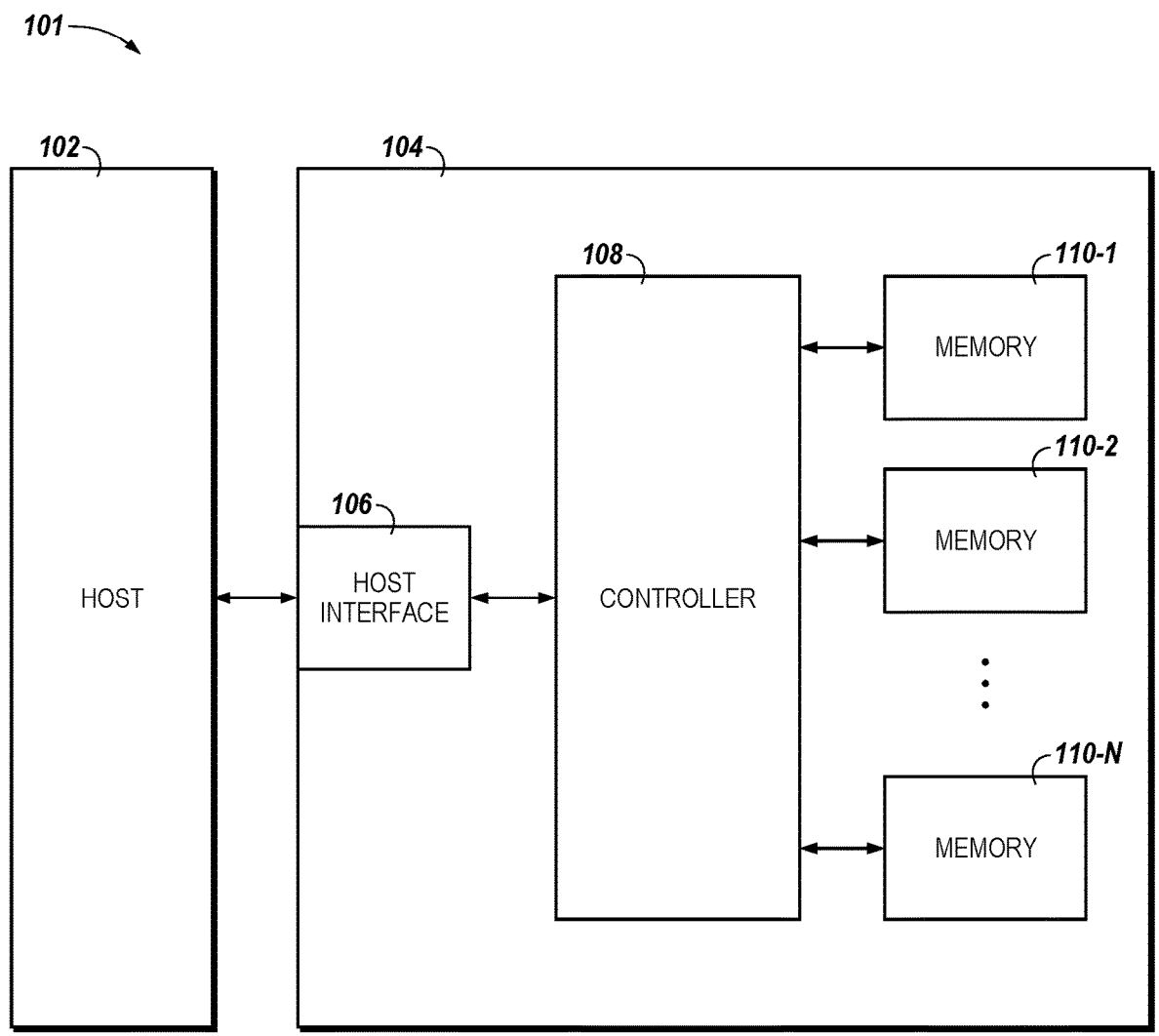
FIG. 1 is a functional block diagram of an apparatus in the form of a computing system comprising a memory system in accordance with a number of embodiments of the present disclosure.

Apparatuses and methods for an adaptive throttling are provided. Memory systems, such as an SSD, can be used in data centers and in enterprise. SSDs can undergo demanding workloads that can increase the operating temperatures of the SSDs beyond thermal throttling limits. Over controlling (e.g., over throttling) may result in low performance of the SSDs whereas under controlling (e.g., under throttling) may increase the power consumption of system level cooling. As an example, consider an SSD with an operating temperature of 70° C. Assume that the threshold operating temperature is 60° C. Over thermal throttling may cause the operating temperature to drop from 70° C. to 55° C. Because the operating temperature would be 5° C. less than the threshold operating temperature, the SSD may have lower performance associated with changing the operating temperature to 55° C. as compared to the performance of the SSD associated with the threshold operating temperature of 60° C. In contrast, under thermal throttling may cause the operating temperature to only drop from 70° C. to 65° C. Because the operating temperature would be 5° C. greater than the threshold operating temperature, the system level cooling system may consume more power in order to cool the SSD operating at a temperature five degrees over the threshold operating temperature. It can be advantageous to have a memory system, such as an SSD, that can be precisely controlled (e.g., precisely throttled).

Workload demands and/or performance modes associated with high performance or time critical applications can require high performance of SSDs at the cost of higher operating temperatures. In contrast, workload demands and/or performance modes associated with cost sensitive applications can require moderate performance of SSDs such that high operating temperatures may not be necessary. An SSD can include a plurality of sensors that can measure and/or be indicative of the operating temperature of the SSD. The SSD can include a plurality of control measures by which the operating temperature can be controlled. The control measures can include, but are not limited to, the quantity of active tracks, sequencer delay, processor frequency, and voltage scaling. Control measures are discussed in further detail in association with FIG. 6 below. As used herein, "the quantity of active tracks" refers to the quantity of planes of a memory system currently active. For example, an SSD can include sixteen NAND dies, each of the NAND dies including two planes. Each plane can include sixteen thousand bytes of data. Planes of a memory system can be active when an operation (e.g., a NAND operation) is being performed on the planes; for example, when data is being read, programmed (written), and/or erased from the planes. A controller of the SSD can refer to a register that defines the maximum amount of data that can be transferred from DRAM of the SSD to the NAND of the SSD, and vice versa. To program two pages of data, four active tracks may be needed whereas to program four pages of data, six active tracks may be needed.

In some previous approaches, time and resources may be spent to tune and optimize a throttling control algorithm of an SSD to satisfy just one set of requirements. For example, a throttling control algorithm may be tuned and optimized for just high performance or time critical applications, or a throttling control algorithm may be tuned and optimized for just cost sensitive applications; not both high performance or time critical applications and cost sensitive applications. Previous SSD throttling control algorithms are not capable of satisfying the requirements associated with multiple workload demands and/or performance modes.

Interfaces, such as Peripheral Component Interconnect Express (PCIe) or Non-Volatile Memory Express (NVMe), can enable SSDs to be placed close to a central processing unit (CPU). This can benefit the physical link layer by decreasing transaction overhead. Because SSDs can have bandwidths ten to a hundred times greater than that of hard disk drives (HHDs), SSDs can handle workload demands associated with multiple applications. To satisfy these workload demands, SSDs can include controllers with increasing processing power and quantities of hardware modules. High performance data flows can be fully managed via hardware such that an interruption in the hardware driven data flows can be catastrophic.

Embodiments of the present disclosure can be used with multiple workload demands and/or performance modes. At least one embodiment can include an adaptable control architecture that can be implemented via hardware. The adaptable control architecture can dynamically adjust the magnitude of a control signal to achieve a desired performance associated with the current workload demands and/or performance mode. In contrast to some previous approaches that may invert a forward adaptive filter (e.g., a feed forward estimator), at least one embodiment includes an inverse adaptive filter that is separate and distinct from a forward adaptive filter. Thus, at least one embodiment can reduce, and even eliminate, the stability risk associated with inverting the forward adaptive filter. At least one embodiment can include finite impulse response (FIR) filters, which can be more stable than proportional-differential (PD) filters, proportional-integral (PI) filters, and/or proportional-integral-differential (PID) filters used by some previous approaches.

At least one embodiment can include a thermal throttling capability that can be used with multiple performance modes buy adapting algorithms to the requirements of the current one of the multiple performance modes. At least one embodiment can achieve an optimum performance level at any ambient working conditions and/or workload demands without being tuned manually. In some previous approaches, if the thermal throttling algorithm is incorrectly tuned then the performance of the memory system may be suboptimal. At least one embodiment can implement a single adaptation algorithm in each of the adaptive filters. The single adaptation algorithm can be implemented in hardware. At least one embodiment can control multiple control measures. At least one embodiment can determine which sensor of a sensor network is best suited to achieve a threshold operating temperature.

In one or more embodiments of the present disclosure, an apparatus can include a plurality of adaptive filters to determine a throttle rate at which to apply a control signal. The apparatus can include an inverse adaptive filter configured to determine an estimated magnitude of a control signal associated with a particular control measure based on a measured operating temperature. As used herein, "control measure" refers to a mechanism of a system by which an operating characteristic of the system can be controlled. As used herein, "operating temperature" refers to the temperature of a memory or a memory system at which the memory or the memory system is operating. The apparatus can include a forward adaptive filter configured to determine an estimated operating temperature based on a magnitude of the control signal. The apparatus can include an adaptive filter configured to determine a throttle rate at which to apply the control signal based on a change magnitude of the control signal. As used herein, "change magnitude of a control signal" refers to how much the current magnitude of a control signal is to be changed. For example, if the current magnitude of the control signal is five and the magnitude of the control signal is to be two, then the change magnitude of the control signal is negative three. The forward adaptive filter, the inverse adaptive filter, and the adaptive filter can be configured to use the same adaptation algorithm. The apparatus can include a filter configured to determine the change magnitude of the control signal based on the difference between the measured operating temperature and a threshold operating temperature.

As used herein, "a number of" something can refer to one or more such things. For example, a number of memory cells can refer to one or more memory cells. Additionally, the designators "N", "B", "R", and "S", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 234 may reference element "34" in FIG. 2, and a similar element may be referenced as 734 in FIG. 7. Analogous elements within a Figure may be referenced with a hyphen and extra numeral or letter. See, for example, elements 350-1, 350-2, 350-3, 350-4, and 350-5 in FIG. 3. Such analogous elements may be generally referenced without the hyphen and extra numeral or letter. For example, elements 350-1, 350-2, 350-3, 350-4, and 350-5 may be collectively referenced as 350.

FIG. 1 is a functional block diagram of an apparatus in the form of a computing system 101 comprising a memory system 104 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example.

The memory system 104 can be, for example, an SSD. In the embodiment illustrated in FIG. 1, the memory system 104 includes a host interface 106, a memory (e.g., a number of memory devices 110-1, 110-2, . . . , 110-N) (e.g., solid state memory devices), and a controller 108 (e.g., an SSD controller) coupled to the physical host interface 106 and the memory devices 110-1, 110-2, . . . , 110-N.

The memory devices 110-1, 110-2, . . . , 110-N can include, for example, a number of non-volatile memory arrays (e.g., arrays of non-volatile memory cells). For instance, the memory devices 110-1, 110-2, . . . , 110-N can include a number of memory arrays.

In some embodiments, the memory devices 110-1, 110-2, . . . , 110-N can include a number of arrays of memory cells (e.g., non-volatile memory cells). The arrays can be flash arrays with a NAND architecture, for example. However, embodiments are not limited to a particular type of memory array or array architecture. As described above in connection with FIG. 1, the memory cells can be grouped, for instance, into a number of blocks including a number of physical pages of memory cells. In a number of embodiments, a block refers to a group of memory cells that are erased together as a unit. A number of blocks can be included in a plane of memory cells and an array can include a number of planes. As one example, a memory device may be configured to store 8 kB (kilobytes) of user data per page, 128 pages of user data per block, 2048 blocks per plane, and 16 planes per device. A number of physical blocks of memory cells can be included in a plane of memory cells, and a number of planes of memory cells can be included on a die. Each physical block can be part of a single die.

In operation, data can be written to and/or read from a memory device of a memory system (e.g., the memory devices 110-1, 110-2, . . . , 110-N of the memory system 104) as a page of data, for example. As such, a page of data can be referred to as a data transfer size of the memory system. Data can be transferred to/from a host 102 in data segments referred to as sectors (e.g., host sectors). As such, a sector of data can be referred to as a data transfer size of the host. In some embodiments, NAND blocks may be referred to as erase blocks, with blocks being a unit of erasure and pages being a measure of reads and/or writes.

A host interface 106 can be used to communicate information between the memory system 104 and another device such as a host 102. The host 102 can include a memory access device (e.g., a processor). As used herein, "a processor" can intend a number of processors, such as a parallel processing system, a number of coprocessors, etc. Example hosts can include personal laptop computers, desktop computers, digital cameras, digital recording and playback devices, mobile (e.g., smart) phones, PDAs, memory card readers, interface hubs, and the like.

The host interface 106 can be in the form of a standardized physical interface. For example, when the memory system 104 is used for information storage in the computing system 101, the host interface 106 can be a serial advanced technology attachment (SATA) physical interface, a peripheral component interconnect express (PCIe) physical interface, or a universal serial bus (USB) physical interface, among other physical connectors and/or interfaces. In general, however, the host interface 106 can provide an interface for passing control, address, information (e.g., data), and other signals between the memory system 104 and a host (e.g., the host 102) having compatible receptors for the host interface 106.

The controller 108 can include, for example, control circuitry and/or logic (e.g., hardware and firmware). The controller 108 can be included on the same physical device (e.g., the same die) as the memory devices 110-1, 110-2, . . . , 110-N. For example, controller 108 can be an application specific integrated circuit (ASIC) coupled to a printed circuit board including a physical host interface 106 and the memory devices 110-1, 110-2, . . . , 110-N. Alternatively, the controller 108 can be included on a separate physical device that is communicatively coupled to the physical device that includes the memory devices 110-1, 110-2, . . . , 110-N. In a number of embodiments, components of the controller 108 can be spread across multiple physical devices (e.g., some components on the same die as the memory, and some components on a different die, module, or board) as a distributed controller.

The controller 108 can communicate with the memory devices 110-1, 110-2, . . . , 110-N to sense (e.g., read), program (e.g., write), and/or erase information, among other operations. The controller 108 can have circuitry that may be a number of integrated circuits and/or discrete components. In a number of embodiments, the circuitry in the controller 108 may include control circuitry for controlling access across the memory devices 110-1, 110-2, . . . , 110-N and/or circuitry for providing a translation layer (e.g., a flash translation layer) between the host 102 and the memory system 104.

The controller 108 can include a first adaptive filter (e.g., an inverse adaptive filter) configured to determine an estimated magnitude of a control signal associated with a particular control measure based on a magnitude of a signal from a sensor, wherein the signal is indicative of operating temperature of a memory system. The controller 108 can include a second adaptive filter (e.g., a forward adaptive filter) configured to determine an estimated operating temperature based on a magnitude of the control signal. The controller 108 can include a third adaptive filter configured to determine a throttle rate for the control signal based on a change magnitude of the control signal. The controller 108 can include a fourth filter configured to determine the change magnitude of the control signal based on a difference between the magnitude of the signal and a threshold operating temperature. The first adaptive filter, the second adaptive, and the third adaptive filter can be configured to use the same adaptation algorithm. The filters can be implemented in the controller 108 via firmware and/or hardware.

The embodiment illustrated in FIG. 1 can include additional circuitry, logic, and/or components not illustrated so as not to obscure embodiments of the present disclosure. For example, the memory device 104 can include address circuitry to latch address signals provided over I/O connectors through I/O circuitry. Address signals can be received and decoded by a row decoders and column decoders, to access the memory devices 110-1, 110-2, . . . , 110-N.

Figure 2:
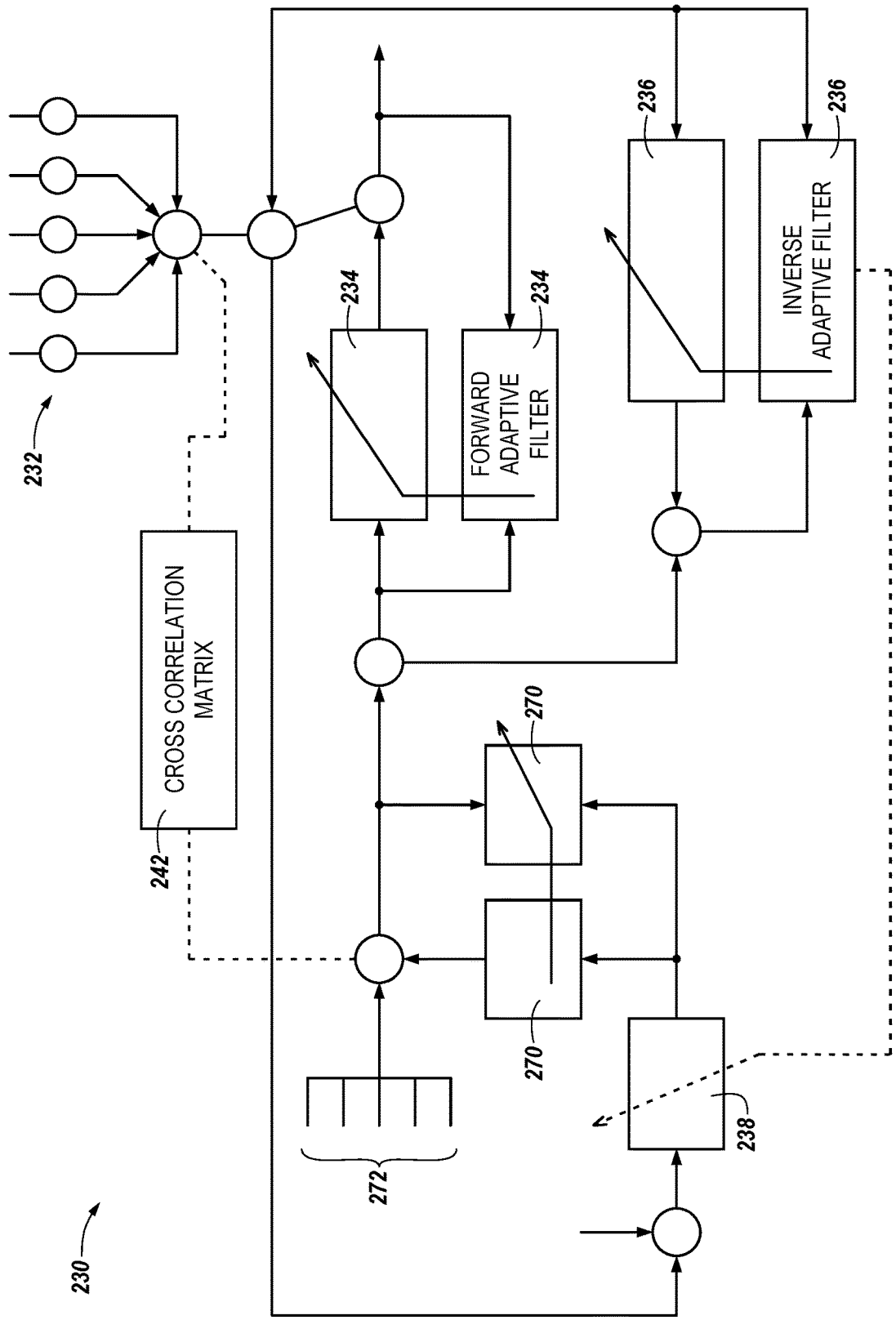
FIG. 2 illustrates a block diagram of an adaptive control architecture in accordance with a number of embodiments of the present disclosure.

FIG. 2 illustrates a block diagram 230 of an adaptive control architecture in accordance with a number of embodiments of the present disclosure. The adaptive control architecture illustrated in FIG. 2 can be implemented in or by the controller 108 shown in FIG. 1. The adaptive control architecture can include three adaptive filters: a forward adaptive filter 234, an inverse adaptive filter 236, and an adaptive filter 270. The forward adaptive filter 234 can verify that the operating temperature is responsive to a change in the control signal associated with the control measure. The forward adaptive filter 234 is discussed in further detail in association with FIG. 7 below.

Figure 3:
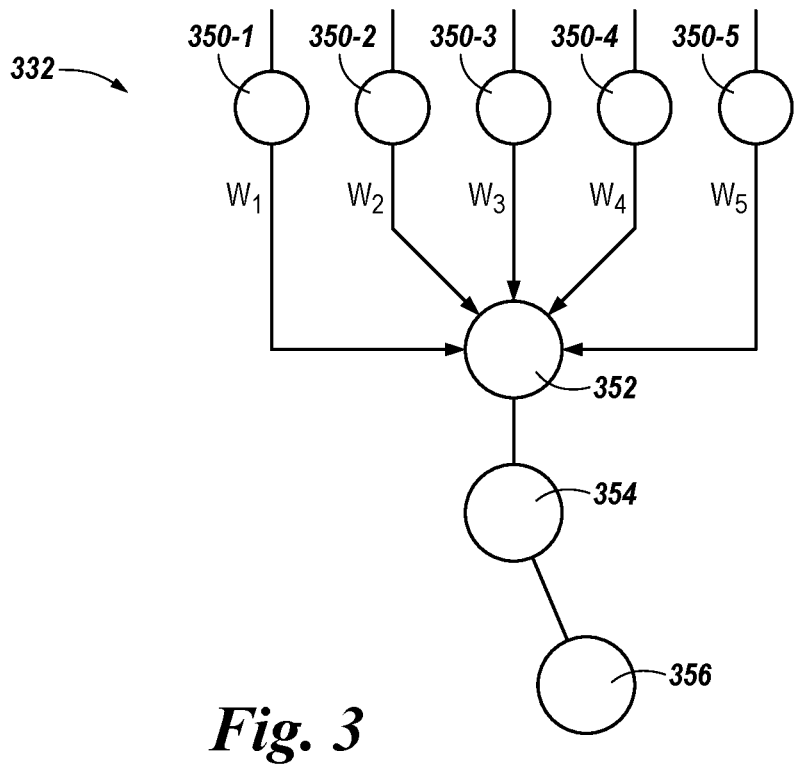
FIG. 3 illustrates a sensor network that can be coupled to a controller in accordance with a number of embodiments of the present disclosure.
Figure 4:
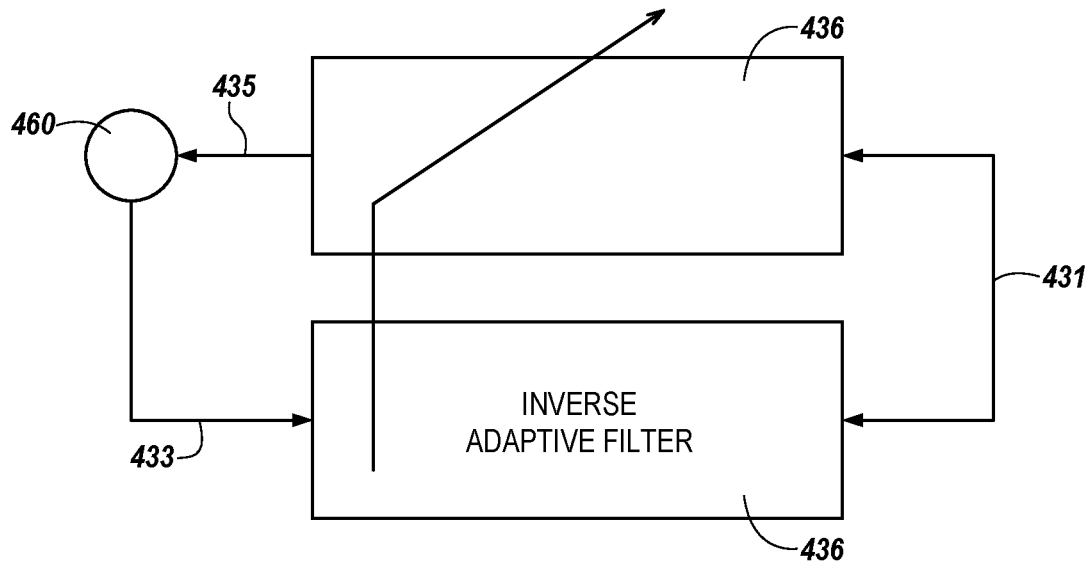
FIG. 4 illustrates an inverse adaptive filter of an adaptive control architecture in accordance with a number of embodiments of the present disclosure.
Figure 5:
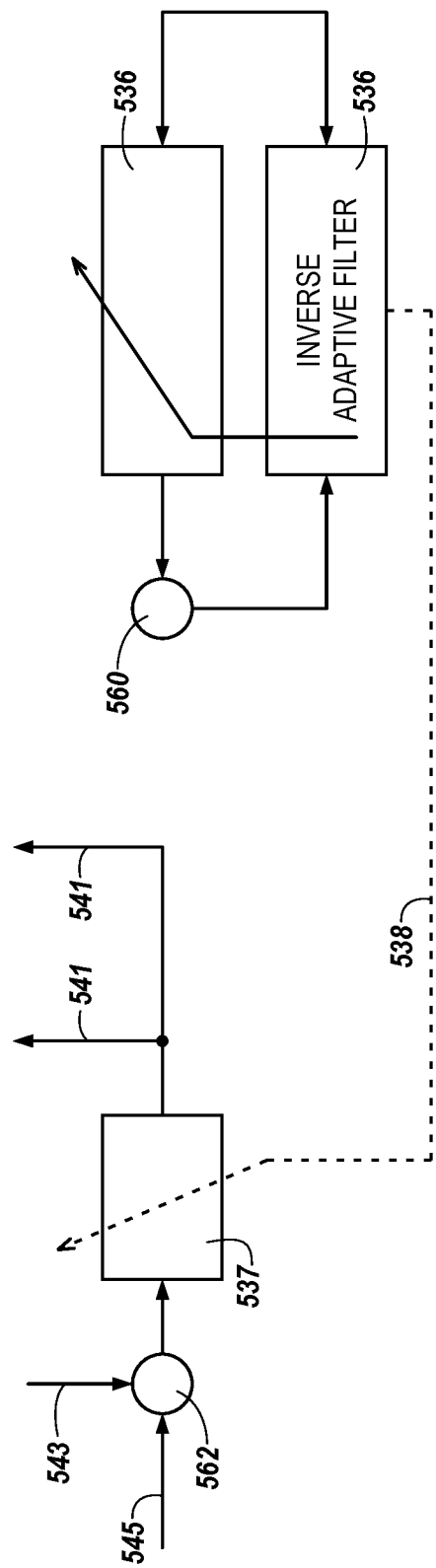
FIG. 5 illustrates a portion of an adaptive control architecture in accordance with a number of embodiments of the present disclosure.
Figure 6:
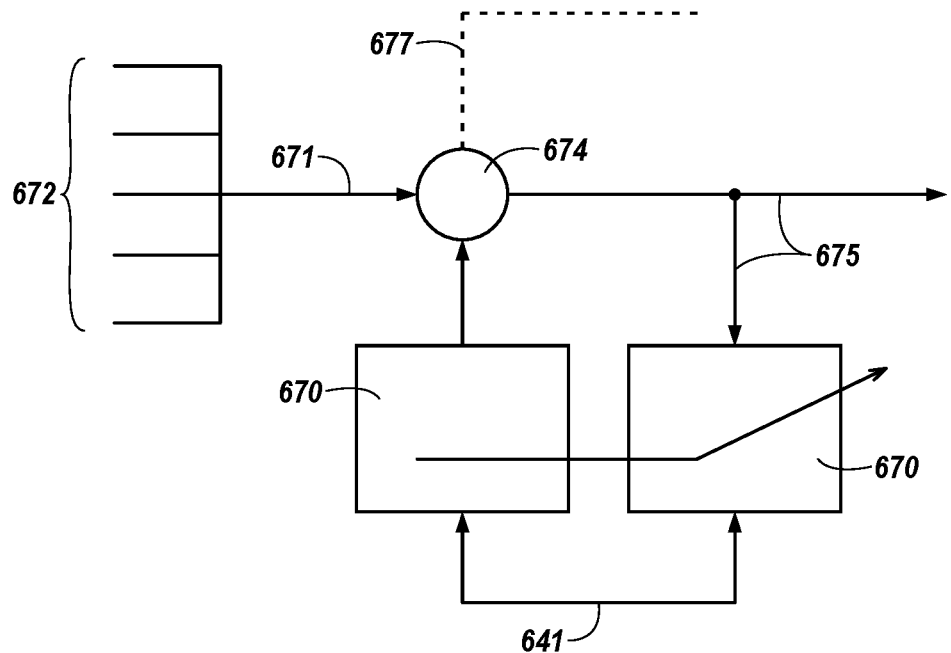
FIG. 6 illustrates a portion of an adaptive control architecture in accordance with a number of embodiments of the present disclosure.

The solid lines illustrated in FIGS. 2-7 represent a hard interconnect or a hard interface between components of the adaptive control architecture. In contrast, the dotted lines illustrated in FIGS. 2, 5, and 6 represent a soft interconnect or a soft interface between components of the adaptive control architecture. A soft interconnect or interface can be turned on and off as needed by the adaptive control architecture, without negatively impacting the performance of the memory system. For example, as discussed in further detail in association with FIG. 3 below, the cross correlation matrix 242 can be used to weight signals from the sensor network 232 based on the relevance of the sensors to adjusting the operating temperature of the memory system. After the signals have been weighted, the soft interconnect between the cross correlation matrix and the sensor network 232 can be turned off until it is needed again.

The inverse adaptive filter 236 can determine an estimated magnitude of a control signal associated with a control measure based on a measured operating temperature. The inverse adaptive filter 236 is discussed in further detail in association with FIG. 4 below. The measured operating temperature can be obtained from the sensor network 232. Although FIG. 2 shows the sensor network 232 as a component of the block diagram 230, the sensor network 232 may not be a component of the controller. Rather the sensor network 232 can be coupled to a controller such that signals indicative of the operating temperature can be used by the adaptive control architecture. The sensor network 232 is discussed in further detail in association with FIG. 3 below.

The filter 238 can determine a change magnitude of the control signal based on a difference between the measured operating temperature and a threshold operating temperature. The filter 238 can use the weights used by the inverse adaptive filter 236. The inverse adaptive control provided by the inverse adaptive filter 236 and the filter 238 is discussed in further detail in association with FIG. 5 below.

The adaptive control architecture illustrated by the block diagram 230 can be used to operate the memory system in different performance modes. The different performance modes are represented by the group of lines 272. The adaptive filter 270 can determine a throttle rate at which to apply the change magnitude of the control signal to the control measure. The performance modes and the adaptive filter 270 are discussed in further detail in association with FIG. 6 below.

As shown in the block diagram 230, the adaptive control architecture can include a cross correlation matrix 242. The cross correlation matrix 242 can be a time domain cross correlation between two signals. A strong correlation between the two signals can be indicated when the multiplicative numbers of the time domain cross correlation are high. The time domain cross correlation can indicate the time delay between the two signals. The time domain cross correlation can indicate that a sensor signal is high when the operating temperature of a memory system is high. The cross correlation matrix 242 can provide weights associated with the performance modes to the sensor network 232. Although FIG. 2 shows the cross correlation matrix 242 as a component of the block diagram 230, the weights of the cross correlation matrix 242 can be stored on the controller or off the controller. For example, the weights can be stored in SRAM such that each weight corresponds to a location in the SRAM.

FIG. 3 illustrates a sensor network 332 that can be coupled to a controller in accordance with a number of embodiments of the present disclosure. The sensor network 332 can be analogous the sensor network 232 illustrated in FIG. 2. The sensor network 332 can include a plurality of sensors 350-1, 350-2, 350-3, 350-4, and 350-5. Although FIGS. 2 and 3 show five sensors, the sensor network 332 can include any number of sensors. One or more of the sensors 350 can be coupled to the memory system, such as the memory system 104 illustrated in FIG. 1. One or more of the sensors 350 can be coupled to components of a system that includes the memory system. Signals $W_1$, $W_2$, $W_3$, $W_4$, and $W_5$ from the sensors 350-1, 350-2, 350-3, 350-4, and 350-5, respectively, can be indicative of an operating temperature of the memory system, but not necessarily directly measuring the operating temperature. The sensors 350 can include, but are not limited to, a temperature sensor on a printed circuit board assembly (PCBA), a mid-die temperature sensor (e.g., a mid-die thermistor), a temperature sensor coupled to NAND and/or DRAM, a voltage sensor coupled to NAND and/or DRAM, an over temperature interrupt, a temperature sensor coupled to a host interface (e.g., the host interface 106 illustrated in FIG. 1), and a buffer counter. A buffer counter can indicate an amount of incoming host traffic. For example, if commands from a host are throttled at a high rate, the amount of incoming host traffic (e.g., an amount of incoming sectors) will increase over a period of time. As used herein, "over temperature interrupt" refers to a device that interrupts an electric current when the device is heated to a particular temperature. The sensors 350 can include multiple types of sensors. For example, the sensor 350-1 can be a fan speed sensor coupled to a fan of a host, such as the host 102 illustrated in FIG. 1, or a fan of a memory system, such as the memory system 104. If the signal $W_1$ indicates a fast speed of the fan, then the signal $W_1$ can indicate a high operating temperature of the memory devices and/or the memory system.

The sensor network 332 can include a summing node 352. A summing node can be implemented in firmware or hardware and be used to add two signals (including signed signals). Signals from two or more sensors, for example, the signals $W_1$ and $W_2$, can be added together at the summing node 352. The controller and the adaptive control architecture can use the sum of the signals as the signal representing the measured operating temperature, which can be an input of the inverse adaptive filter 236 illustrated in FIG. 2. A weighted sum of signals from two or more sensors can be generated at the summing node 352. A weighted sum of signals from all available sensors can be generated at the summing node 352. Weights, such as those from the cross correlation matrix 242 illustrated in FIG. 2, can be used in generating the weighted sum.

The sensors 350 can be weighted based on the relevance of the sensor to adjusting the operating temperature of the memory devices or the memory system. For example, a sensor that directly measures the operating temperature of a memory system can be more relevant to achieving and/or maintaining a threshold operating temperature than, for example, a fan speed sensor. Weights from the cross correlation matrix can ensure that a signal from a particular sensor is responsive to a change in a control signal associated with a control measure. For example, as discussed above a signal from a fan speed sensor of a host can be indicative of the operating temperature of a memory system. Thus, the speed of the fan can be controlled to affect the operating temperature of the memory system. However, a signal from a sensor that determines the operating temperature of a graphics processing unit (GPU) of the host might not be as responsive to the change in a control signal.

Weights from the cross correlation matrix can be used in determining a time delay between a change in a signal from sensors, for example, the signal $W_1$, in response to a change in a correlating control signal. For example, the control measure can be the quantity of active tracks of a memory system. If the quantity of active tracks is increased from ten active tracks to twelve active tracks then the time between changing the quantity of active tracks from ten to twelve and a change in the signal from the sensor (e.g., a measured operating temperature).

FIG. 4 illustrates an inverse adaptive filter 436 of a controller in accordance with a number of embodiments of the present disclosure. The inverse adaptive filter 436 can be analogous to the inverse adaptive filter 236 illustrated in FIG. 2. The inverse adaptive filter 436 can be configured to adapt a transfer function between a measured operating temperature and an estimated magnitude of a control signal associated with a control measure. For example, the inverse adaptive filter 436 can adapt a transfer function between a measured operating temperature and an estimated quantity of active tracks. The inverse adaptive filter 436 can determine an estimated magnitude of a control signal (e.g., an estimated quantity of active tracks) based on, or as a function of, the measured operating temperature. The inverse adaptive filter can be utilized as an adaptive controller.

The inverse adaptive filter 436 can be a finite impulse response (FIR) filter. The inverse adaptive filter 436 can use a least mean squares (LMS) algorithm or a normalized least mean squares (NLMS) algorithm. The inverse adaptive filter 436 can use the time delay found by applying weights from the cross correlation matrix to a sensor network as described above in association with the sensor network 332 illustrated in FIG. 3. The estimated magnitude of the control signal output by the inverse adaptive filter 436 can be input to the summing node 460 as represented by the line 435. At the summing node 460, the magnitude of the control signal can be compared to the estimated magnitude of the control signal. The difference between the magnitude of the control signal and the estimated magnitude of the control signal can be fed back to the inverse adaptive filter 436 as represented by the line 433.

The following pseudocode is an example of an adaptation algorithm that can be used by the inverse adaptive filter 436:

```
def AdaptiveLms(line_delay, y, wt, Pred, Err, rd, un):
    if len(line_delay) > 15:
        line_delay.pop(0)
        for idx in range(10):
            y = y + line_delay[idx]*wt[idx]
            if y > 200 or y < -10:
                y = 200
        err = un - y
        Pred.append(y)
        Err.append(err)
```

```
wt[0] = 1
for idx in range(10):
    wt[idx] = wt[idx]*0.98 + 0.0000025*err*rd
```

The above pseudocode defines a LMS adaptation algorithm. The inputs to the adaptation algorithm are the time delay (line_delay), the result of transfer function between a signal from a sensor and the control signal (y), the weight(s) of the filter (wt), the output of the filter (Pred), the difference between the output of the filter and the expected output of the filter (Err), the expected output of the filter (un), and an input to the filter (rd). The weights can correspond to the control measure and/or the performance mode. The filter adaptation rate can be a function of the input to the filter (rd). The filter adaption rate controls how rapidly or how slowly the adaptation occurs. The smaller the filter adaption rate, the slower the adaptation. The filter adaptation rate can be controlled independently instead of being a function of the input to the filter (rd).

The adaptation algorithm can be used with multiple control signals associated with multiple control measures. The adaptation algorithm can keep the multiple control signals in sync such that one control measure is not dominant over the other control measures. The adaptation algorithm can be used with weights associated with multiple performance modes during continuous operation of the memory system. The performance modes can be changed during continuous operation of the memory without having to stop and manually tune an algorithm for each different performance mode.

In contrast to some previous approaches, such as a PID filter, at least one embodiment can implement multiple PID algorithms. The multiple PID algorithms may be tuned manually so that the multiple PID algorithms perform adequately in various operating conditions.

As an example, assume that the control measure is the quantity of active tracks. The adaptation algorithm pseudocode described above can be invoked by the inverse adaptive filter 436 using the following pseudocode:
AdaptiveLms(active_inverse, y_inv, wti, ssdInversePred, ssdInverseErr, temp, adie)

Based on the time delay (active_inverse) and the weight (wti), which is initialized at one, the estimated quantity of active tracks (y_inv=y_inv+active_inverse[idx]*wti[idx] and ssdInversePred.append(y_inv)) can be determined. The time delay and the weight can be accumulated to generate the output of the adaptation algorithm (ssdInversePred). The difference (ssdInverseErr) can be fed back to the inverse adaptive filter 436. Each weight can be updated with the multiplication of the difference (ssdInverseErr) between the actual quantity of active tracks (adie) and the estimated quantity of active tracks (y_inv), and the measured operating temperature (temp). The time delay can be dependent on the memory system. For example, the inverse adaptive filter 436 can implement the adaptation algorithm so long as the time delay is greater than fifteen microseconds. A time delay of less than fifteen microseconds can imply that the operating temperature responds quickly to a corresponding change in the control signal. In a different memory system, the time delay may be fifteen nanoseconds or fifteen microseconds. An estimated change in the operating temperature, based on a change in the magnitude of the control signal, can then be determined using the estimated magnitude of the control signal.

FIG. 5 illustrates a portion of an adaptive control architecture in accordance with a number of embodiments of the present disclosure. The portion of the adaptive control architecture illustrated in FIG. 5 shows how the inverse adaptive filter 536 can be utilized as a control algorithm. The node 560 and the inverse adaptive filter 536 can be analogous to the node 460 and the inverse adaptive filter 436 illustrated in FIG. 4. After the inverse adaptive filter 536 adapts the transfer function between the signal from the sensor network (e.g., the measured operating temperature) and an estimated magnitude of a control signal (e.g., an estimated quantity of active tracks), the threshold operating temperature can be introduced to the adaptive control architecture. As used herein, "threshold operating temperature" refers to a maximum operating temperature associated with a particular performance mode. For example, a high performance mode can have a higher threshold operating temperature than that of a low performance mode. Performance modes are discussed in further detail in association with FIG. 6 below.

The following pseudocode can be used by the filter 537:

```
def AdaptiveControl(error_signal, y, wc, Control):
    error_signal.pop(0)
    for idx in range(10):
        y = y + error_signal[idx]*wc[idx]
    Control.append(y)
```

The inputs to the adaptation algorithm are the difference (error_signal) between the signal from the sensor network (e.g., the measured operating temperature) and the threshold operating temperature, a result of the filter 537 ($y$), weights (wc), and the output of the filter 537 (Control) (e.g., the change magnitude of the control signal). The pseudocode described above can be invoked by the filter 537 using the following pseudocode:

```
if len(ssdInversePred) > 0:
    error_signal.append(ssdInversePred[-1]-50)
    AdaptiveControl(error_signal, y_cont, wti, Control)
```

The weights used by the inverse adaptive filter (wti) can be used by the filter 537. error_signal.append(ssdInversePred[-1]-50) represents a delay line. In the above pseudocode, the delay line shifts the data to eliminate the oldest number (e.g., a maximum index) and inputs the most current number to the index 0.

The measured operating temperature, represented by the line 545, and the threshold operating temperature, represented by the line 543, can be input to the summing node 562. The summing node 562 can output the difference between the threshold operating temperature and the measured operating temperature, which can be input to the filter 537. The weights from adapting the transfer function with the inverse adaptive filter 536 can be input to the filter 537 as represented by the dotted line 538. After the weights have been input to the filter 537, the soft interconnect or interface between the inverse adaptive filter 536 and the filter 537 can be turned off. Using these weights the filter 537 can determine a change magnitude of the control signal based on the difference between the threshold operating temperature and the measured operating temperature. The adapted transfer function from the inverse adaptive filter 536 can be used to determine the change magnitude of the control signal necessary to adjust the operating temperature to be less than or equal to the threshold operating temperature.

FIG. 6 illustrates a portion of an adaptive control architecture in accordance with a number of embodiments of the present disclosure. FIG. 6 shows a plurality of performance modes represented by the lines 672, which can be analogous to the plurality of performance modes represented by the lines 272 illustrated in FIG. 2. The performance modes can affect the threshold operating temperature, the weights of the cross correlation matrix, and/or the throttle rate. Examples of performance modes can include, but are not limited, high performance mode, low performance mode, low power mode, and mode control. Mode control can allocate a budget of active tracks or flash credits to different threads and processes. The high performance mode can be associated with a high threshold operating temperature. A high threshold operating temperature, for example, 70° C., can allow a memory system to operate at a high bandwidth. For example, if the control measure is the quantity of active tracks then a high threshold operating temperature can permit a greater quantity of tracks to be active concurrently, thereby increasing the bandwidth of the memory system. In contrast, the low power mode can be associated with a low threshold operating temperature, for example, 55° C. For example, if the control measure is the quantity of active tracks then a low threshold operating temperature can permit a fewer quantity of tracks to be active concurrently, thereby reducing the power consumption of the memory system.

The performance modes can determine the control measure. For example, if a memory system is to operate in a high performance mode, then a control measure that is more likely to ensure that the memory system operates in the high performance mode can be used. Embodiments of the present disclosure can be used with different types of control measures. Core voltages can be a control measure. Core voltages can be core voltages of a controller of the memory systems, such the controller 108 illustrated in FIG. 1. Core voltages can be controlled via adaptive voltage scaling (AVS), which can be implemented in a clock domain. Clock frequencies can be a control measure. Clock frequencies can be controlled via adaptive frequency scaling (AFS), which can be implemented in a clock domain. For example, the clock frequency of the memory system can be a control measure. The quantity of active tracks can be a control measure. A quantity of flash credits can be a control measure. Flash credits can be analogous to active tracks in a credit-based system. Clock voltages can be a control measure. Clock voltages can be controlled via dynamic voltage scaling (DVS). A quantity of memory block can be turned off as a control measure, for example, via random number generators or clock gating. Components (e.g., modules) of the memory system can be put idle as a control measure. For example, DRAM or a memory controller can be put idle. DRAM of a memory system can be put in a lower power state as a control measure. The processing bandwidth associated with a clock can be throttled down as a control measure. For example, the processing bandwidth can be throttled down by throttling down an error correction unit (ECU) or a sequencer. The quantity of active cores can be a control measure. For example, the number of cores of the central processing unit (CPU) of a host including the memory system that are active can be controlled. The speed of a fan, such as a fan at system level integration, can be a control measure. The workload mix can be a control measure. For example, increasing the quantity of sequential incoming host data can reduce the quantity of garbage collection actives within the memory system, thereby reducing the quantity of active tracks or needed flash credits. The incoming command rate can be a control measure. For example, the host can throttle commands issued to the memory system. The memory system can reduce the quantity of command credits give to the host. Bus frequencies can be a control measure. For example, the frequency of an Open NAND Flash Interface (ONFI), a DRAM bus, and/or an on-chip bus can be controlled. Examples of an on-chip bus include, but are not limited to, an Advanced Microcontroller Bus Architecture (AMBA) High-Performance Bus (AHB) or an AMBA Peripheral Bus (APB). Commands can be delayed as a control measure. A delay can be added to a command to slow down the command issued to the memory system. For example, a delay can be added to a write, read, or erase command issued to NAND. Programing modes of memory cells of the memory system can be changed as a control measure. For example, a QLC programing mode or a TLC programing mode can be changed to a SLC programing mode. The SLC programing mode can have a shorter programing time than the QLC programing mode or the TLC programing mode, which can reduce the power consumption of the memory system. The quantity of meta data or journal data written to the memory system can be a control measure. Reducing the quantity of meta data or journal data written to the memory system can reduce the quantity of active tracks or needed flash credits. Erasing modes of memory cells of the memory system can be changed as a control measure. For example, SLC data can be erased in a SLC erasing mode in contrast to a MLC erasing modes. The SLC erasing mode can have a shorter erasing time than the MLC erasing mode, which can reduce the power consumption of the memory system. The size of dynamic task first in, first out (FIFO) can be a control measure. The quantity of active commands in various tasks can be reduced, which can reduce overall system parallelism. The priority of a real time operating system (RTOS) scheduler can be changed as a control measure. For example, the priority of high power consuming tasks can be lowered with firmware (FW) execution. In at least one embodiment, the control measure can be a combination of any of the aforementioned control measures.

The adaptive filter 670 can be a FIR filter. The adaptive filter 670 can use a LMS algorithm or a NLMS algorithm. The adaptive filter 670 can determine a throttle rate at which to apply the change magnitude of the control signal based on the performance mode. The adaptive filter 670 can estimate the impact of the change magnitude of the control signal on the performance of the memory system. The adaptive filter 670 can implement the same adaptation algorithm as the inverse adaptive filter and the forward adaptive filter. For example, the adaptive filter 670 can implement the adaptation algorithm defined by the pseudocode described in association with FIG. 4 above.

The change magnitude of the control signal from the filter 537 illustrated in FIG. 5 can be an input to the adaptive filter 670 as represented by the lines 641. The change magnitude of the control signal can be applied to the node 674 at the throttle rate. The change magnitude of the control signal can be applied as a sliding function or a step function. The change magnitude of the control signal can be applied as a function of a flush rate. As used herein, "flush rate" refers to the rate at which active tracks are allocated. The flush rate can be indicative of the quantity of operations (e.g., NAND operations) are currently being performed. The flush rate can take into account how much data is currently being stored on DRAM of the memory system. The performance mode can be input to the node 674 to determine which of the weights of the cross correlation matrix to apply to the sensor network. After the performance mode has been input to the cross correlation matrix, the soft interconnect or interface between the node 674 and the cross correlation matrix, represented by the dotted line 677, can be turned off. The magnitude of the control signal, after applying the change magnitude of the control signal, can be fed back to the adaptive filter 670 and a demultiplexer (not shown in FIG. 6) as represented by the lines 645. The node 674 can be a control mechanism configured to apply the control signal to the control measure at the throttle rate. The control mechanism can be configured to control hysteresis and prevent a sudden switch from a first performance mode including throttling of the control signal and a second performance mode that does not include throttling of the control signal.

Figure 7:
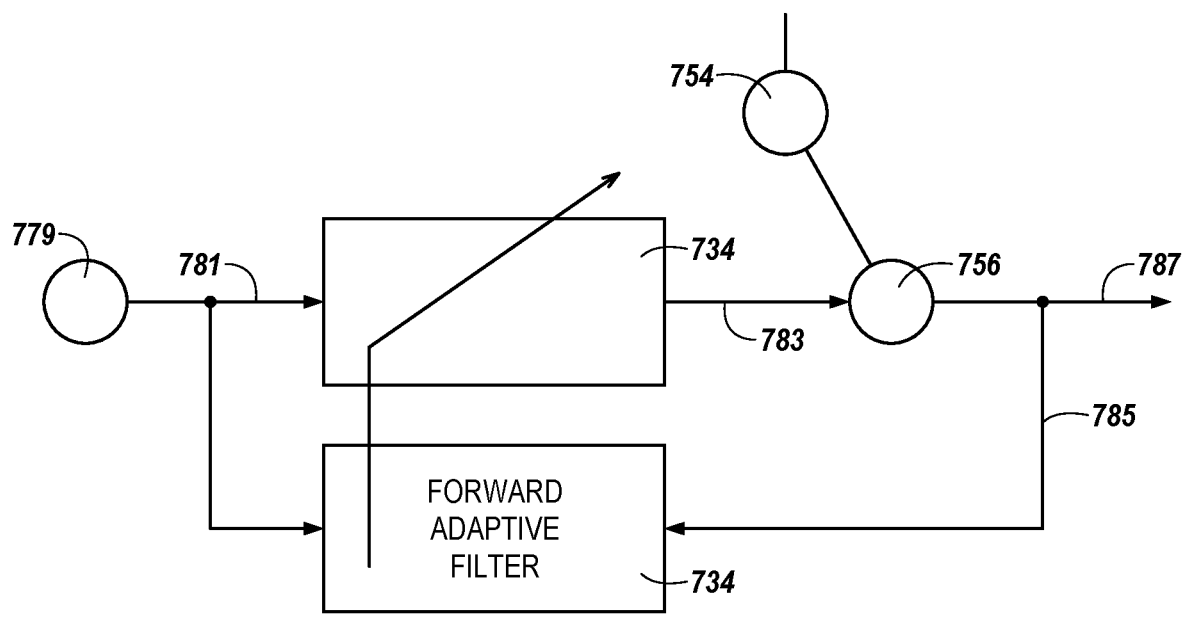
FIG. 7 illustrates a forward adaptive filter of an adaptive control architecture in accordance with a number of embodiments of the present disclosure.

FIG. 7 illustrates a forward adaptive filter 734 of an adaptive control architecture in accordance with a number of embodiments of the present disclosure. The forward adaptive filter 734 can be analogous to the forward adaptive filter 234 illustrated in FIG. 2. The forward adaptive filter 734 can be configured to adapt a transfer function between a magnitude of a control signal and an estimated operating temperature. For example, the forward adaptive filter 734 can adapt a transfer function between a quantity of active tracks and an estimated operating temperature. The forward adaptive filter 734 can determine an estimated operating temperature based on, or as a function of, the magnitude of a control signal (e.g., a quantity of active tracks). Because the forward adaptive filter 734 can as a check to verify that the operating temperature is responsive to a change in the control signal associated with the control measure, the forward adaptive filter 734 can be disabled. It may not be necessary to always verify that the operating temperature is responsive to a change in the control signal. The forward adaptive filter 734 can be periodically disabled. The forward adaptive filter 734 can be disabled.

Because the inverse adaptive filter can use the same time delay as the forward adaptive filter 734, there is no need to invert the forward adaptive filter 734. Whereas the inverse adaptive filter can determine the change magnitude of the control signal to achieve an operating temperature less than or equal to an threshold operating temperature, the forward adaptive filter 734 can verify that the change magnitude of the control signal caused the operating temperature to be less than or equal to the threshold operating temperature.

The forward adaptive filter 734 can be a FIR filter. The forward adaptive filter 734 can use a LMS algorithm or a NLMS algorithm. The forward adaptive filter 734 can use the time delay found by applying weights from the cross correlation matrix to a sensor network as described above in association with the sensor network 332 illustrated in FIG. 3. The estimated operating temperature output by the forward adaptive filter 734 can be input to the summing node 756 as represented by the line 783. At the summing node 756, the measured operating temperature can be compared to the estimated operating temperature. The difference between the measured operating temperature and the estimated operating temperature can be fed back to the forward adaptive filter 734 as represented by the line 785. The difference between the measured operating temperature and the estimated operating temperature can be output to other components of the computing system as represented by the line 787.

The sample rate of the signal from the sensor network to the forward adaptive filter 734 can be tuned. As used herein, "sample rate" refers to a time interval between receiving a signal from the sensor network (e.g., the time interval between operating temperature measurements). The quantity of taps of the forward adaptive filter 734 can be tuned. As used herein, "quantity of taps of a filter" refers to the order of the filter. For example, a simple implementation can include one tap per weight of the filter. A more complex implementation can include twenty to thirty weights used by filter, which can be dependent on the transfer function between the signal from the sensor network and the control signal. The quantity of taps can refer to the quantity of inputs previously used in generating the output of the filter.

The forward adaptive filter 734 can implement the same adaptation algorithm as the inverse adaptive filter 236 and the adaptive filter 270 illustrated in FIG. 2. For example, the forward adaptive filter 734 can implement the adaptation algorithm defined by the pseudocode described in association with FIG. 4 above. As an example, assume that the control measure is the quantity of active tracks. The adaptation algorithm pseudocode described above can be invoked by the forward adaptive filter 734 using the following pseudocode:

```
AdaptiveLms(activ_delay, y_act, wta, ssdActivePred, ssdActiveErr,
adie, temp)
```

Based on the time delay (actio_delay) and the weights (wta), which is initialized at one, the estimated operating temperature (y_act=y_act+activ_delay[idx]*wta[idx] and ssdActivePred.append(y_act)) can be determined. The time delay and the weight can be accumulated to generate the output of the adaptation algorithm (ssdActivePred). The difference (ssdActiveErr) can be fed back to the forward adaptive filter 734. Each weight can be updated with the multiplication of the difference (ssdActiveErr) between the measured operating temperature (temp) from the summing node 756 and the estimated operating temperature (y_act), and the quantity of active tracks (adie).

Figure 8:
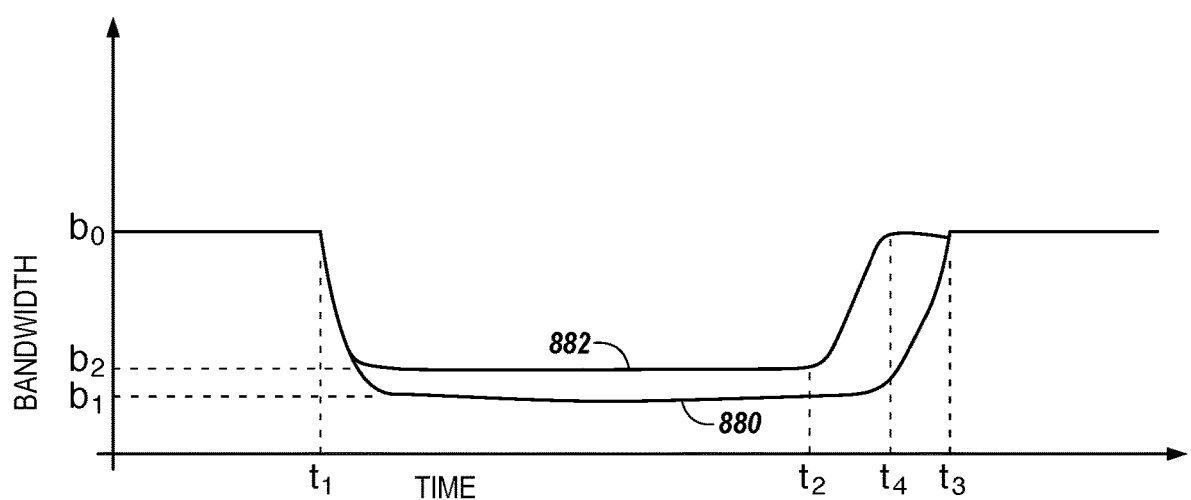
FIG. 8 illustrates a graphical performance comparison of some previous approaches and an adaptive control architecture in accordance with a number of embodiments of the present disclosure.

FIG. 8 illustrates a graphical performance comparison of some previous approaches and an adaptive control architecture in accordance with a number of embodiments of the present disclosure. The horizontal axis of the graph illustrated in FIG. 8 is time and the vertical axis is the bandwidth of the memory system, such as the memory system 104 illustrated in FIG. 1. For example, the units of the horizontal axis can be seconds (s) and the units of the vertical axis can be megabits per second (Mb/s). The line 880 represents the bandwidth of the memory system that is controlled according to some previous approaches. The line 882 represents the bandwidth of the memory system that is controlled according to at least one embodiment of the present disclosure.

At the time $t_1$, the performance mode is changed resulting in a change in the threshold operating temperature. The performance mode is changed from an in initial performance mode to a performance mode associated with reduced power consumption (e.g., the low power mode). In the example of FIG. 8 the control measure is the quantity of active tracks. In order to lower the operating temperature to be less than or equal to the threshold operating temperature associated with the low power mode, the quantity of active tracks is reduced. Reducing the quantity of active tracks reduces the bandwidth of the memory systems.

At the time $t_1$, the line 880 begins to fall from the bandwidth $b_0$ as the quantity of active tracks is reduced. The bandwidth $b_0$ can be the steady state bandwidth associated with the initial performance mode. Shortly after the time $t_1$, the line 80 reaches steady state at the bandwidth $b_1$. At the time $t_2$, the performance mode is changed from the low power mode to the initial performance mode. From the time $t_2$ to the time $t_3$, the line 880 rises from the bandwidth $b_1$ to the bandwidth $b_0$ as the quantity of active tracks is increased. Note that there is a delay from when the performance mode is changed at the time $t_2$ and when the bandwidth begins to change rapidly. This delay is due to the inability of some previous approaches to react quickly to changes in performance modes.

At the time $t_1$, the line 882 begins to fall from the bandwidth $b_0$ as the quantity of active tracks is reduced. Shortly after the time $t_1$, the line 882 reaches steady state at the bandwidth $b_2$. The bandwidth $b_2$ is greater than the steady state bandwidth $b_1$ achieved by some previous approaches. In contrast to some previous approaches, at least one embodiment does not over control the memory system. The quantity of active tracks is controlled precisely such that the operating temperature is less than or equal to the threshold operating temperature without sacrificing additional bandwidth (the difference between the bandwidth $b_2$ and the bandwidth $b_1$). Bandwidth of the memory system can be indicative of the power consumption of the memory system. Thus, the greater bandwidth $b_2$ as compared to the bandwidth $b_1$ means that at least one embodiment can allow the memory system to operate at a higher power consumption rate while maintaining an operating temperature that is less than or equal to the threshold operating temperature.

At the time $t_2$, the performance mode is changed from the low power mode to the initial performance mode. From the time $t_2$ to the time $t_4$, the line 882 rises from the bandwidth $b_2$ to the bandwidth $b_0$ as the quantity of active tracks is increased. Note that there is little or no delay from when the performance mode is changed at the time $t_2$ and when the bandwidth begins to change rapidly in contrast to some previous approaches. At least one embodiment can reach the bandwidth $b_0$ in approximately half the time than some previous approaches (compare the time $t_3$ to the time $t_4$). At least one embodiment can react quickly to a change in performance modes. As a result of the precise control of the control measure, at least one embodiment can have less steady state error than some previous approaches. As used herein, "steady state error" refers to the difference between the input of a system (e.g., a control signal associated with a particular operating temperature) and the output of the system (e.g., a measured operating temperature).

Figure 9:
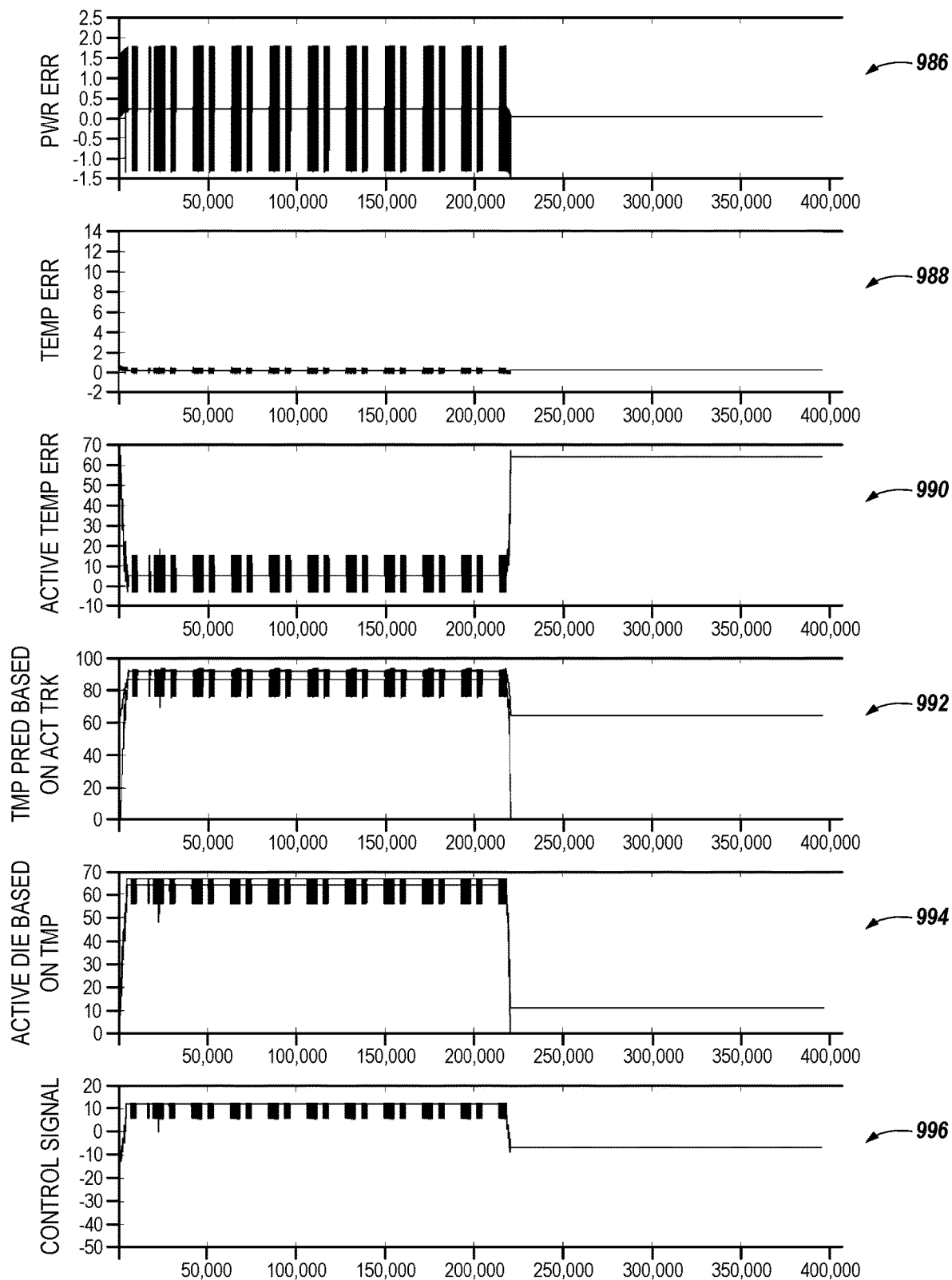
FIG. 9 illustrates simulation results from a controller in accordance with a number of embodiments of the present disclosure.

FIG. 9 illustrates simulation results from an adaptive control architecture in accordance with a number of embodiments of the present disclosure. The graphs 986, 988, and 990 illustrate errors from an adaptation algorithm in accordance with a number of embodiments of the present disclosure. In the example of the graph 986, a temperature signal from the sensor network is the input and power is the output. In the example of the graph 988, the measured operating temperature is the input and the estimated operating temperature is the output. In the example of the graph 990, the threshold operating temperature is the input and the actual operating temperature is the output. The adaptation algorithm that described in association with FIG. 4 above. The horizontal axis of the graphs 986, 988, and 990 are clock cycles. The error (err) between the output of the adaptation algorithm and the signal from the sensor network. The graph 986 shows the power error between the estimated power of the memory system and the measured power of the memory system. The graph 988 shows the operating temperature error between the estimated operating temperature and the measured operating temperature. The graph 990 shows the active tracks to operating temperature error between the estimated quantity of active tracks and the measured operating system.

The graphs 992, 994, and 996 illustrate control signals from an adaptation algorithm in accordance with a number of embodiments of the present disclosure. The adaptation algorithm that described in association with FIG. 4 above. The horizontal axis of the graphs 992, 994, and 996 are clock cycles. The graph 992 shows the estimated operating temperature from a forward adaptive filter, such as the forward adaptive filter 234 illustrated in FIG. 2, and the quantity of active tracks (the magnitude of the control signal). In the example of the graph 992, the quantity of active tracks is the input and estimated operating temperature is the output. The graph 994 shows the estimated quantity of active NAND dies from an inverse adaptive filter, such as the inverse adaptive filter 236 illustrated in FIG. 2, and the measured operating temperature. In the example of the graph 994, the quantity of active NAND dies is the input and estimated operating temperature is the output. The graph 996 shows the throttle rate of the change magnitude of the control signal from an adaptive filter, such as the adaptive filter 270 illustrated in FIG. 2.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
a memory device; and
a processing device coupled to the memory device to perform operations comprising:
determining, using an adaptive algorithm, an estimated magnitude of a control signal associated with a control measure based on a magnitude of a signal from a sensor;
determining, using the adaptive algorithm, an estimated operating temperature based on a magnitude of the control signal;
determining a change magnitude of the control signal based on a difference between the magnitude of the signal from the sensor and a threshold operating temperature;
determining, using the adaptive algorithm, a throttle rate at which to apply the control signal based on the change magnitude of the control signal;
applying the change magnitude of the control signal to the memory device at the determined throttle rate.

2. The system of claim 1, further comprising a first adaptive filter coupled to the processing device and configured to determine the estimated magnitude of the control signal based on a difference between the estimated magnitude of the control signal and the magnitude of the control signal.

3. The system of claim 1, further comprising a second adaptive filter coupled to the processing device and configured to determine the estimated operating temperature based on a difference between the magnitude of the signal from the sensor and the estimated operating temperature.

4. The system of claim 1, further comprising a third adaptive filter coupled to the processing device and configured to determine the throttle rate based on the magnitude of the control signal.

5. The system of claim 1, wherein the processing device is to perform operations further comprising applying weights associated with the control measure.

6. The system of claim 1, wherein the processing device is to perform operations further comprising updating weights used in the adaptation algorithm.

7. The system of claim 1, wherein the processing device is to perform operations further comprising accumulating weights used in the adaptation algorithm.

8. The system of claim 1, wherein the processing device is to perform operations further comprising:
applying a first plurality of weights associated with a first performance mode of the memory device, and
applying a second plurality of weights associated with a second performance mode of the memory device.

9. The system of claim 1, wherein the processing device is to perform operations further comprising determining the change magnitude of the control signal based on weights used to determine the estimated magnitude of the control signal.

10. The system of claim 1, wherein the processing device is to perform operations further comprising:
controlling hysteresis; and
preventing a sudden switch from a first performance mode including throttling of the control signal and a second performance mode that does not include throttling of the control signal.

11. A method of operating a memory device, comprising:
obtaining a performance mode of the memory device;
obtaining weights from a cross correlation matrix corresponding to the performance mode;
adapting a transfer function between a magnitude of a control signal associated with a particular control measure and an estimated operating temperature of the memory device;
adapting a transfer function between a measured operating temperature of the memory device and an estimated magnitude of the control signal;
determining a change magnitude of the control signal based on a difference between the measured operating temperature and a threshold operating temperature; and
throttling the change magnitude of the control signal as the control signal is applied to the memory device.

12. The method of claim 11, further comprising:
applying the weights from the cross correlation matrix to a plurality of signals from a plurality of sensors, wherein each signal from each of the plurality of sensors is indicative of an operating temperature of the memory device; and selecting a signal from one of the plurality of sensors based on the application of the weights, wherein a magnitude of the signal correlates to the measured operating temperature.

13. The method of claim 12, wherein selecting the signal comprises determining if the one of the plurality of sensors corresponds to a control measure that affects the operating temperature of the memory device, wherein the plurality of sensors include a plurality of types of sensors.

14. The method of claim 12, wherein selecting the signal comprises determining a time delay between a change in the signal in response to a change in the control signal.

15. The method of claim 12, wherein applying the weights includes applying a particular weight corresponding to the performance mode of the memory device.

16. The method of claim 11, further comprising:

applying the weights from the cross correlation matrix to a plurality of signals from a plurality of sensors, wherein each signal from each of the plurality of sensors is indicative of an operating temperature of the memory device; and generating a weighted sum of signals from the plurality of sensors, wherein a magnitude of the weighted sum correlates to the measured operating temperature.

17. The method of claim 11, further comprising determining the particular control measure based on the performance mode of the memory device.

18. A system, comprising:

a memory device; and a processing device coupled to the memory device to perform operations comprising:

identifying a signal from a sensor that is responsive to a change in a control signal associated with a control measure;

determining a time delay between the change in the control signal and a change in the signal from the sensor resulting from the change in the control signal;

determining an estimated magnitude of the control signal based on the signal from the sensor;

determining a change magnitude of the control signal; and throttling the change magnitude of the control signal based on a bandwidth associated with a performance mode.

19. The system of claim 18, wherein the processing device is to perform operations further comprising:

applying weights associated with the performance mode to a plurality of signals from a plurality of sensors including the signal from the sensor;

identifying the signal from the sensor based on the weights; and determining the estimated magnitude of the control signal based on a weighted sum of a plurality of signals from a plurality of sensors including the signal from the sensor.

20. The system of claim 18, wherein the processing device is to perform operations further comprising changing from the control measure to a different control measure in response to changing from the performance mode to a different performance mode during continuous operation of the memory device.

* * * * *